US008028164B2

(12) United States Patent
Paatero

(10) Patent No.: US 8,028,164 B2
(45) Date of Patent: Sep. 27, 2011

(54) PRACTICAL AND SECURE STORAGE ENCRYPTION

(75) Inventor: Lauri Paatero, Helsinki (FI)

(73) Assignee: Nokia Corporation, Espoo (FI)

( * ) Notice: Subject to any disclaimer, the term of this patent is extended or adjusted under 35 U.S.C. 154(b) by 818 days.

(21) Appl. No.: 10/804,852

(22) Filed: Mar. 19, 2004

(65) Prior Publication Data

US 2005/0210280 A1    Sep. 22, 2005

(51) Int. Cl.
*H04L 29/06* (2006.01)
(52) U.S. Cl. .............................. 713/164; 726/26; 726/30
(58) Field of Classification Search .................. 713/164, 713/189, 161; 726/30
See application file for complete search history.

(56) References Cited

U.S. PATENT DOCUMENTS 4,987,595 A * 1/1991 Marino, Jr. et al. ........... 713/164
6,662,020 B1 * 12/2003 Aaro et al. ................. 455/552.1
2003/0014653 A1 * 1/2003 Moller et al. ................. 713/193
2003/0033537 A1 * 2/2003 Fujimoto et al. ............. 713/193
2003/0084309 A1 * 5/2003 Kohn ............................. 713/189
2004/0158742 A1 * 8/2004 Srinivasan et al. ............ 713/201
2004/0225885 A1 * 11/2004 Grohoski et al. ............. 713/189

* cited by examiner

*Primary Examiner* — Kambiz Zand
*Assistant Examiner* — Amare F Tabor
(74) *Attorney, Agent, or Firm* — Ware, Fressola, Van Der Sluys & Adolphson LLP

(57) ABSTRACT

The present invention relates to an electronic device (301) in which acceleration of data processing operations is provided, the device comprising a secure execution environment to which access is controlled. A basic idea of the present invention is to provide a device (311) for acceleration of data processing operations (an "accelerator"). In particular, the accelerator is used to accelerate cryptographic data operations such that it performs cryptographic operations on data provided to it via a first logical interface. The cryptographic operations are performed by means of encryption/decryption keys provided to the accelerator via a secure second logical interface which may share a same physical interface (312) with the first logical interface or which may use a distinct physical interface (414) from that of a distinct physical interface (412) used as the first logical interface.

9 Claims, 4 Drawing Sheets

PRACTICAL AND SECURE STORAGE ENCRYPTION

TECHNICAL FIELD OF THE INVENTION

The present invention relates to an electronic device in which acceleration of data processing operations is provided, the device comprising a secure execution environment to which access is controlled. The present invention further relates to a mobile communication terminal comprising the electronic device and a device for acceleration of data processing operations.

BACKGROUND ART

Various electronic devices, e.g. mobile telecommunication terminals, portable computers and PDAs, require access to security related components such as application programs, cryptographic keys, cryptographic key data material, intermediate cryptographic calculation results, passwords, authentication means for externally downloaded data etc. Typically, it is necessary that these components, and the processing of them, is kept secret within the electronic device. Ideally, they shall be known by as few people as possible since a device possibly can be tampered with if its security related components are known. Access to these types of components might aid an attacker which has a malicious intent to manipulate a terminal.

Therefore, a secure execution environment is introduced in which environment a processor within the electronic device is able to access the security related components. Access to the secure execution environment, processing in it and exit from it should be carefully restricted. Prior art hardware comprising this secure environment is often enclosed within a tamper resistant packaging. It should not be possible to probe or perform measurements and tests on this type of hardware which could result in the revealing of security related components and the processing of them.

In order to protect data in the device, data residing in permanent, i.e. non-volatile, memories should be encrypted. Data protection is highly desired, since a malicious person may try to access sensitive data in the device in case this person attains access to the device, e.g. by stealing it. Another scenario where attempts may be made to access sensitive data is when a Digital Rights Management (DRM) system is included in the device. This DRM system stores copyright protected contents and associated digital rights that determine what type of access a user has to the contents. The DRM system is thus used to protect the contents from being accessed by an unauthorized user, misused and/or wrongly distributed. Since the contents and the rights have an economic value, the user may try to access the contents by bypassing DRM control functions. Encryption of the data residing in permanent memory should be secure, efficient and low-cost. As mentioned hereinabove, in current device architectures, it is possible to handle security related components securely in the secure execution environment. However, this may be problematic and results in quite an amount of overhead in terms of transfers of data and control signals, as secure entries to—and exits from—the secure execution environment must be undertaken when performing encryption operations.

On the other hand, encryption can be made highly efficient by using prior art hardware accelerators outside the secure environment. However, another problem arises in that it may then be possible for eavesdroppers to get ahold of security components, such as encryption/decryption keys, from the accelerators, since the components consequently are in the clear. This may be solved by introducing security measures in the device, but will most likely require additional hardware and software and thus create unacceptable escalations of device costs.

SUMMARY OF THE INVENTION

An object of the present invention is thus to provide acceleration of data processing operations in the device, but outside the secure execution environment, to decrease the time required for data processing, in a manner such that secret cryptographic keys employed by the acceleration device are not exposed to the device user or an unauthorized third party.

According to a first aspect of the present invention, an electronic device in which acceleration of data processing operations is provided, comprises a secure execution environment to which access is restricted, and which device further comprises an accelerator for accelerating data processing operations, which accelerator is arranged with a first logical interface over which data to be processed is provided, and a secure second logical interface over which cryptographic keys employed in the operation of processing said data is provided.

According to a second aspect of the present invention, a mobile communication terminal includes a device according to the first aspect of the present invention.

According to a third aspect of the present invention, a device for acceleration of data processing operations comprises a first logical interface over which data to be processed is provided, and a secure second logical interface over which cryptographic keys employed in processing said data is provided.

A basic idea of the present invention is to provide a device for acceleration of data processing operations (an "accelerator"). In particular, the accelerator is used to accelerate cryptographic data operations. To overcome the problems related to prior art accelerators, it is necessary to provide an accelerator which is arranged such that it performs cryptographic operations on data provided to it via a first logical interface. The cryptographic operations are performed by means of encryption/decryption keys provided to the accelerator via a secure second logical interface. To prevent entries/exits to the secure execution environment every time data is to be encrypted/decrypted, the accelerator is located outside the secure environment.

The fact that the secure second logical interface is employed has the effect that the keys are not disclosed to the device user or an unauthorized third party. The term "logical" implies that the first and the second interfaces of the accelerator are separated, but not necessarily physically separated. It is sufficient that they logically can be separated such that it is not possible to access the first logical interface while transfers are made on the secure second logical interface.

Ideally, only so called protected applications, which typically are small-size applications for performing security critical operations inside the secure execution environment, are allowed to handle secret cryptographic keys. Protected applications are applications that may be issued by trusted providers, in which case they must be authenticated, but they may also be issued by any third party, regardless of whether this third party is trusted or not. In the latter case, no authentication occurs. It must be determined from the particular context whether the protected application must be issued by a trusted provider or not. Generally, applications that are arranged in such a way that they have, or are given, the power to jeopardize the security of the device should be trusted.

Protected applications may be regarded as a part of a "normal" application executing outside the secure environment. Protected applications may also comprise applications employed to implement standard functionality in the device. For example, protected applications are utilized for booting the device and loading an operating system into it. It is desirable that not even the device user, even though she cannot be considered to be an unauthorized third party, is given access to the secret cryptographic keys. Possibly, a DRM system is implemented in the device, and since the digital contents—and the associated digital rights—which are rendered by means of the DRM system, have an economic value, the user may try to access the contents by bypassing DRM control functions. Of course, there may be other reasons why a user should not be given access to the keys; the general security aspect must for example be taken into consideration.

In normal device operation mode, the device processor does not have access to security related data located within the secure environment. The security data includes cryptographic keys and algorithms, software for booting the circuitry, secret data such as random numbers used as cryptographic key material, application programs etc. Access to these security data and the processing of it is restricted. When testing and/or debugging the device, which typically is located in a mobile communication terminal, access to the security related data is not allowed. For this reason, the processor is placed in the normal, or "unsecure", operating mode, in which mode it is no longer given access to the protected data within the secure environment. Consequently, in the normal mode, the processor, and the corresponding application it is executing, is not given access to the cryptographic keys of the accelerator.

The present invention is advantageous, since the provision of encryption/decryption keys securely can be controlled, while the initiation of cryptographic operations can be performed by normal application software executing outside the secure execution environment. In practice, normal applications see the accelerator as an ordinary hardware peripheral, which decrypts and/or encrypts data as required. However, normal applications cannot procure sensitive security components associated with the accelerator, such as the cryptographic keys it is using.

Moreover, according to an embodiment of the invention, protected applications may prevent normal applications from accessing the accelerator at any time, for any reasons deemed necessary. For example, if it is discovered that the normal application has been tampered with.

According to an embodiment of the invention, the device processor can be set in one of at least two different operating modes. In the device, storage circuitry are arranged with at least one storage area in which protected data relating to device security are located. The processor is given access to the storage area when a secure processor operating mode is set, and is denied access to said storage area when a normal processor operating mode is set. The fact that the processor and the application which it is executing is, or is not, given access to the storage area is what defines the actual operating modes. The processor is further capable of accessing the secure second logical interface of the accelerator, when the secure processor operating mode is set.

The accessing of the storage area in the storage circuitry defines the secure operation mode of the processor. The storage areas that the processor can access while operating in the secure execution mode is referred to as the secure execution environment. As previously mentioned, these storage areas contain security related components such as e.g. application programs, cryptographic keys, cryptographic key data material, intermediate cryptographic calculation results, passwords, authentication means for externally downloaded data etc. In the secure execution mode, the processor is capable of accessing the secure interface of the accelerator, via which the cryptographic keys are provided. The processor is thus capable of adding keys to, or changing keys in, the accelerator. This is important, and highly advantageous, since the security restrictions imposed on the device in the normal, unsecure processing mode is severe.

According to another embodiment of the invention, the first interface of the accelerator is accessible by any application, while the secure second interface of the accelerator is accessible by protected applications only. Typically, normal applications executed in the device processor, a digital signal processor of the device, or some other processing means in the device, sends data in the clear in to the accelerator, which encrypts the data with a secret encryption key received from the secure environment and returns the encrypted data to the normal application. Hence, this implies that the processor is in its normal operating mode. In the normal operating mode, normal applications can exploit the accelerator services related to the encryption/decryption of data. It is also possible that protected applications want to exploit these services. These protected applications has the authority to do so, and normal applications and protected applications may alternatingly request cryptographic services from the accelerator. However, when the processor operates in the secure execution mode, only protected applications are allowed to execute. Thus, to access the secure second logical interface, the processor must operate in the secure mode and execute a protected application.

According to yet another embodiment of the invention, the accelerator further comprises a configuration register arranged to indicate to the accelerator whether secure operation mode or normal operation mode is set by the processor, and in which configuration register it is further possible to set one of a plurality of possible encryption modes, the accelerator being arranged to operate in the encryption mode set in the register. The use of the accelerator configuration register is advantageous, since the accelerator per se can differentiate between the possible operating modes, and thus need not request mode verifications from the device processor each time it is to perform requested cryptographic operations. The register also enables the accelerator to be arranged with one physical interface providing the first and second logical interfaces. Moreover, the fact that different encryption modes can be set is advantageous, as it is possible to decide, on the fly, whether e.g. cipher block chaining (CBC) mode, electronic code book (EBC) mode, cipher feedback (CFB) mode, plaintext feedback (PFB) mode or any other encryption mode shall be used.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The present invention will be described in greater detail with reference to the following drawings, in which.

DESCRIPTION OF PREFERRED EMBODIMENTS OF THE INVENTION

Figure 1:
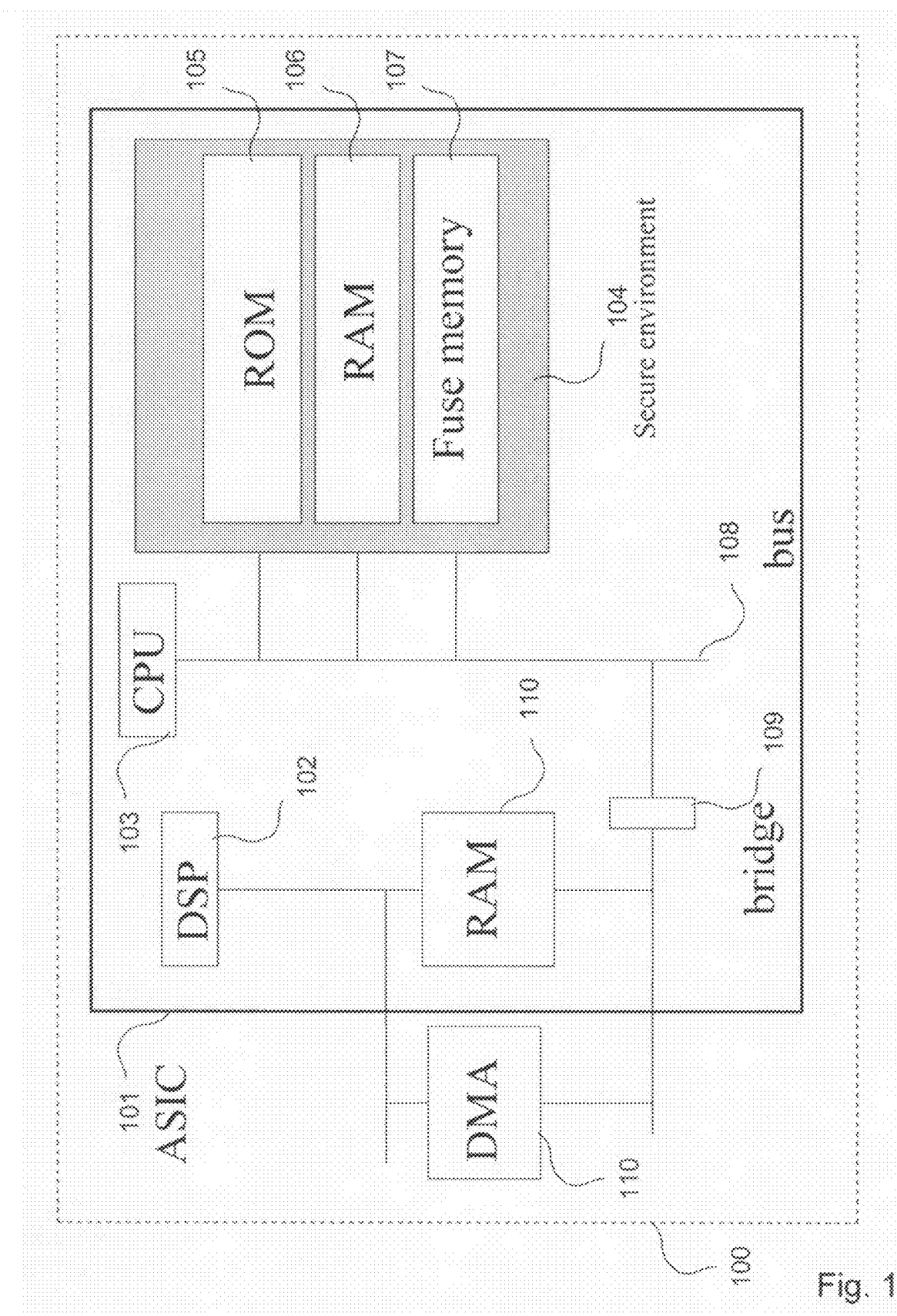
FIG. 1 shows a schematic diagram of a device architecture for providing data security in which architecture the present invention advantageously can be applied.

A device architecture for providing data security is shown in FIG. 1. Such a system is further disclosed in the Applicant's international patent application publication WO2004/015553, which application is incorporated herein by reference. Circuitry for providing data security is implemented in the form of an ASIC (Application Specific Integrated Circuit) 101. The processing part of the architecture contains a CPU 103 and a digital signal processor (DSP) 102. The ASIC 101, is included in an electronic appliance 100 such as a mobile telecommunication terminal, a portable computer, a PDA etc. and is considered to be the "brain" of the appliance 100.

The secure environment 104 comprises a ROM 105 from which the ASIC 101 is booted. This ROM 105 contains boot application software and an operating system. Certain application programs residing in the secure environment 104 have precedence over other application programs. In a mobile telecommunication terminal, in which the ASIC 101 can be arranged, a boot software should exist, which software includes the main functionality of the terminal. It is not possible to boot the terminal to normal operating mode without this software. This has the advantage that by controlling this boot software, it is also possible to control the initial activation of each terminal.

The secure environment 104 also comprises RAM 106 for storage of data and applications, i.e. protected data. The RAM 106 preferably stores so called protected applications, which are smaller size applications for performing security critical operations inside the secure environment 104, but also objects such as cryptographic keys, intermediate cryptographic calculation results and passwords. Normally, the way to employ protected applications is to let "normal" applications request services from a certain protected application. New protected applications can be downloaded into the secure environment 104 at any time, which would not be the case if they would reside in ROM. Secure environment 104 software controls the downloading and execution of protected applications. The protected applications can access any resources in the secure environment 104 and they can also communicate with normal applications for the provision of security services.

In the secure environment 104, a fuse memory 107 is comprised containing a unique random number that is generated and programmed into the ASIC 101 during manufacturing. This random number is used as the identity of the specific ASIC 101 and is further employed to derive keys for cryptographic operations. Further, storage circuit access control means in the form of a security control register is arranged in the secure environment 104. The purpose of the security control register is to give the CPU 103 access to the secure environment 104, or preventing the CPU 103 from accessing the secure environment 104, depending on the mode set in the register. Operating modes for the CPU 103 can be set in the register by application software, resulting in the fact that the architecture does not have to rely on external signals. From a security viewpoint, this is preferable since by controlling the application software, the setting of processor modes can also be controlled. It is also possible to have an external signal (not shown) connected to the ASIC 101, by which signal it is possible to set the security control register. By using an external signal, a mode change can be executed quickly and easily, which can be advantageous in test environments. A combination of these two mode setting means, i.e. application software as well as external signals, is feasible.

The architecture further comprises a standard bridge circuit 109 for limitation of data visibility on the bus 108. The architecture should be enclosed within a tamper resistant packaging. It should not be possible to probe or perform measurements and tests on this type of hardware which could result in the revealing of security related components and the processing of them. The DSP 102 has access to other peripherals 110 such as a direct memory access (DMA) unit, RAMs, flash memories and additional processors can be provided outside the ASIC 101.

Figure 2:
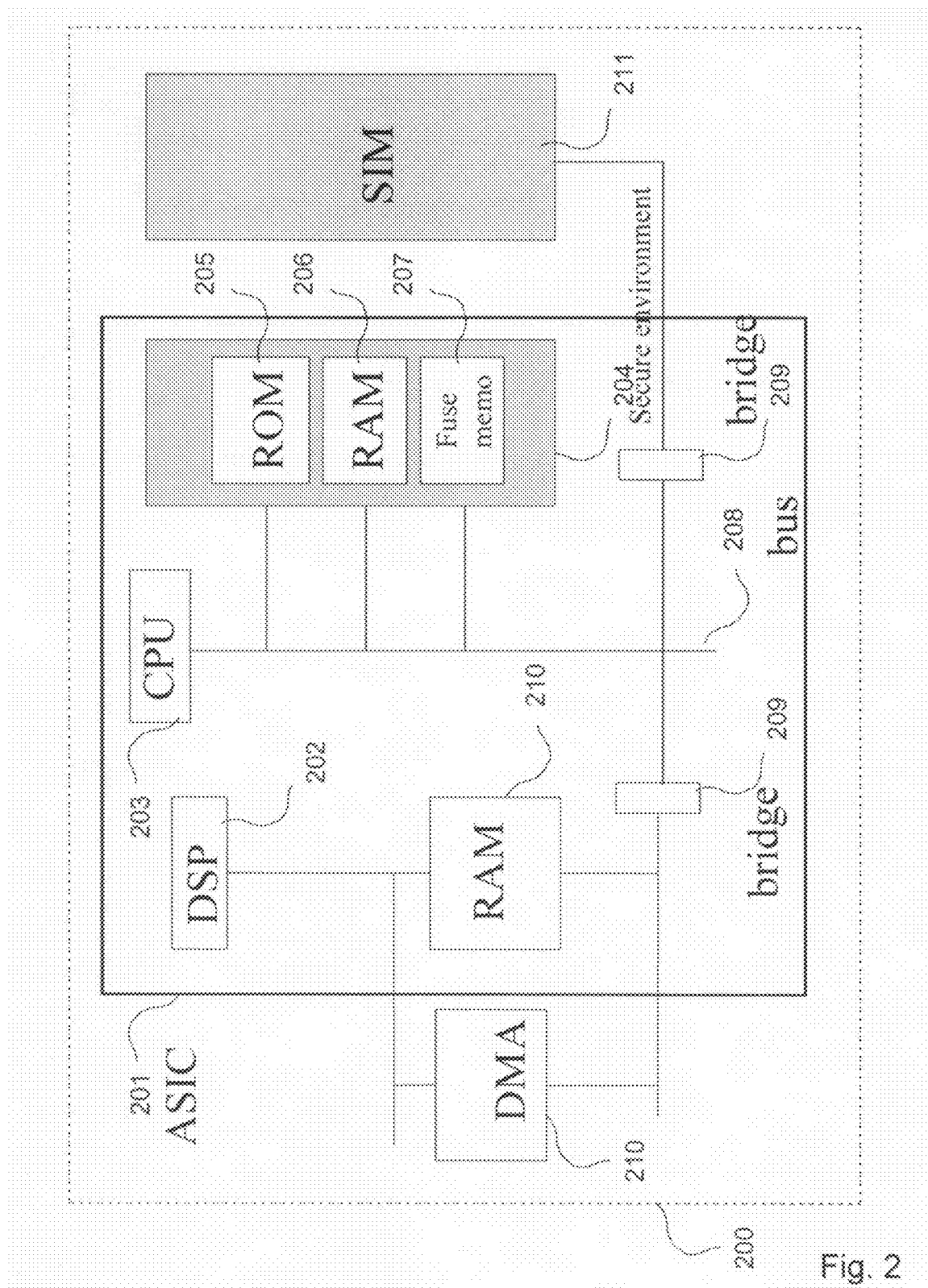
FIG. 2 shows a schematic diagram of the device architecture for providing data security, further arranged with a removable smart card, in which architecture the present invention advantageously can be applied.

Another embodiment of the device architecture for providing data security is shown in FIG. 2, wherein corresponding reference numerals denote corresponding elements as described in connection to FIG. 1. The difference in the architecture shown in FIG. 2, as compared to the architecture illustrated in FIG. 1, is that the electronic appliance 200 is arranged with a removable smart card 211, for example a SIM, which also may be considered to be a secure environment. For security purposes, the mobile terminal 200 and the smart card 211 store digital certificates issued by trusted certification authorities (CAs). Certificates are used to ensure actors communicating with the mobile terminal 200 and/or the smart card 211 that the holder of a specific certificate has been authorized by the corresponding trusted CA. The CA signs the certificate, and the certificate holder must be in possession of the public key that corresponds to the private key of the CA to verify that a certificate signed by the CA is valid. Note that different devices can hold certificates from different CAs. In that case, the different CAs must perform some communication with one another, for example exchange their own public keys. Certificates are well known for those skilled in the art, and a well known standard certificate are the certificate contained in the CCITT recommendation X.509.

Figure 3:
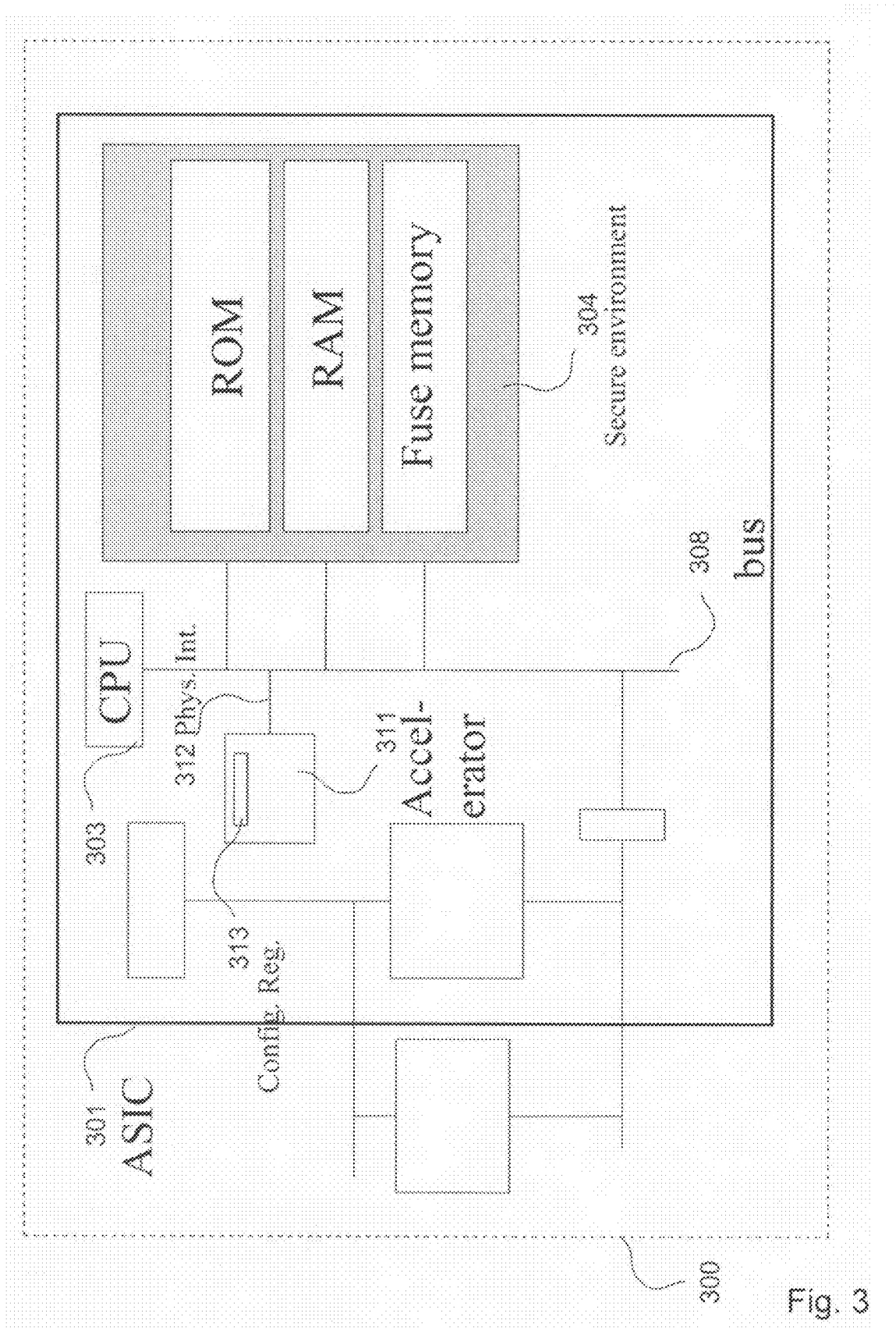
FIG. 3 shows a schematic diagram of an accelerator implemented in the device architecture of FIG. 1, in accordance with an embodiment of the present invention.

FIG. 3 shows a device architecture as described in connection with FIG. 1, here with an accelerator 311 implemented. Again, corresponding reference numerals denote corresponding elements as described with reference to FIG. 1. In this embodiment, the accelerator is arranged with one physical interface 312. When the normal, unsecure execution mode of the processor 303 is set, the physical interface acts as a first logical interface over which data to be encrypted/decrypted is provided. However, when the secure execution mode of the processor is set, the physical interface acts as a secure second logical interface over which cryptographic keys employed in the operation of encrypting/decrypting data is provided. Further in this embodiment, the accelerator is provided with a configuration register 313 arranged to indicate to the accelerator whether secure operation mode or normal operation mode is set by the processor 303. This register is located at an address on the bus 308 to which the processor only is allowed to write if secure execution mode is enabled. Hence, only protected applications are allowed to set, alter or modify this register. If the register 313 is set in an adequate manner, i.e. the register is set with a predetermined code, keys can be written to the accelerator.

Initially, when booting the ASIC 301 implemented in an electronic appliance such as a mobile communication terminal 300, the processor is made to operate in its secure execution mode and a protected application sets the configuration register appropriately, whereupon the protected application can provide the accelerator 311 with cryptographic key(s) via the physical interface 312, which consequently acts as a secure second logical interface. After initialization, the protected application alters the configuration register 313 such that it is not possible, with the given configuration, to modify or change keys in the accelerator. Further, the protected application sets the processor 303 in the normal execution mode and hands over operation of the device 301 to a normal application. The physical interface 312 hence acts as a first logical interface, and the processor can provide the accelerator with data to be cryptographically processed. During operation of the ASIC 301, the cryptographic keys can be altered by the processor executing in the secure execution mode.

In the configuration register, it is further possible to set one of a plurality of possible encryption modes (CBC, EBC, CFB etc) in which the accelerator is arranged to operate.

Figure 4:
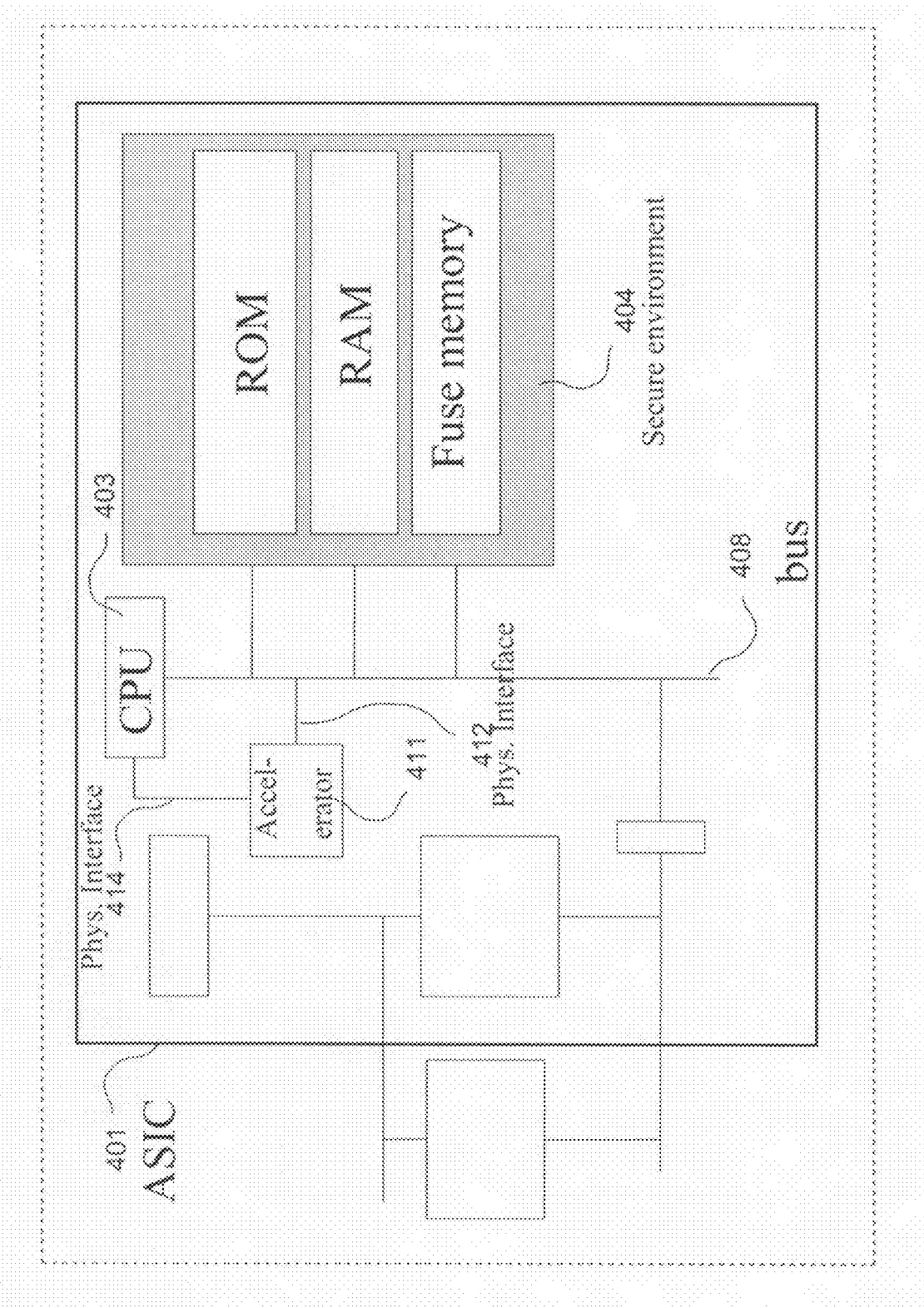
FIG. 4 shows a schematic diagram of an accelerator implemented in the device architecture of FIG. 1, in accordance with another embodiment of the present invention.

FIG. 4 shows a device architecture as described in connection to FIG. 1, here with another embodiment of the accelerator 411 implemented. Again, corresponding reference numerals denote corresponding elements as described with reference to FIG. 1. In this embodiment, the accelerator is arranged with two physical interfaces 412, 414. When the normal, unsecure execution mode of the processor 403 is set, the first physical interface acts as a first logical interface 412 over which data to be encrypted/decrypted is provided. However, when the secure execution mode of the processor is set, the second physical interface acts as a secure second logical interface 414 over which cryptographic keys employed in the operation of encrypting/decrypting data is provided. The secure second logical interface is directly connected to the processor, and the processor is only allowed to write to the second interface if secure execution mode is enabled. Hence, only protected applications are allowed to set, alter or modify the cryptographic keys.

In this embodiment of the accelerator 411, initially, when booting the ASIC 401, the processor is made to operate in its secure execution mode and a protected application sets the cryptographic keys via the secure second logical interface 414. After initialization, the protected application sets the processor 403 in the normal execution mode and hands over operation of the device 401 to a normal application. The processor can thus provide the accelerator with data to be cryptographically processed via the first logical interface 412.

In this embodiment of the accelerator, the accelerator may also be arranged with a configuration register (not shown) in which it is possible to set one of a plurality of possible encryption modes (CBC, EBC, CFB etc) in which the accelerator is arranged to operate. This register may be set by the processor 403 via the secure second logical interface 414.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. An electronic device, comprising:
an accelerator configured to accelerate cryptographic data processing operations, which accelerator comprises:
a first logical interface over which data to be processed is provided, and
a secure second logical interface over which cryptographic keys employed in processing data is provided, wherein the first logical interface and the secure second logical interface share a same physical interface, and said electronic device further comprises
a configuration register configured to indicate to the accelerator whether secure mode or normal mode is set by a processor, and configured to receive mode setting instructions from a protected application, wherein said processor is arranged in the electronic device, and
wherein the first logical interface is not accessible when data is transferred in the second logical interface.

2. The device according to claim 1, wherein the configuration register further is configured such that it may be set in one of a plurality of possible encryption modes, and the accelerator is configured to operate in the encryption mode set in the register.

3. The device according to claim 1, wherein the first logical interface of the accelerator is configured such that it is accessible by any application, while the secure second logical interface of the accelerator is configured such that it is accessible by protected applications only.

4. The device according to claim 3, wherein the protected applications are configured to prevent other applications from accessing the accelerator.

5. The device according to claim 3, wherein the protected applications are applications which are allowed to execute in the secure execution environment.

6. The device according to claim 1, further comprising:
storage circuitry comprising at least one storage area in which protected data relating to device security are located, and
wherein the processor is configured to be set in one of at least two different operating modes;
wherein the processor is given access to said storage area, in which said protected data are located, when a secure processor operating mode is set,
wherein the processor is denied access to said storage area when a normal processor operating mode is set; and
wherein the processor is capable of accessing the secure second logical interface of the accelerator, when the secure processor operating mode is set.

7. The device according to claim 6, wherein the processor is configured such that protected applications control the processor operation mode.

8. A mobile communication terminal comprising a device according to claim 1.

9. A device for acceleration of data processing operations, which device comprises:
a first logical interface over which data to be processed is provided; and
a secure second logical interface over which cryptographic keys employed in processing said data is provided, wherein the first logical interface and the secure second logical interface share a same physical interface, and
a configuration registered configured to indicate to the device whether secure mode or normal mode is set by a processor, and configured to receive mode setting instructions from a protected application, said processor being arranged in the device,
wherein the first logical interface is not accessible when data is being transferred in the second logical interface.

* * * * *